US012555995B2

United States Patent
Kim et al.

(10) Patent No.: US 12,555,995 B2
(45) Date of Patent: Feb. 17, 2026

(54) VEHICLE IMPACT DETECTION DEVICE

(71) Applicant: SAMSUNG SDI CO., LTD., Yongin-si (KR)

(72) Inventors: Hyun Kim, Yongin-si (KR); Kyosung Koo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 156 days.

(21) Appl. No.: 18/611,445

(22) Filed: Mar. 20, 2024

(65) Prior Publication Data

US 2025/0141213 A1    May 1, 2025

(30) Foreign Application Priority Data

Oct. 26, 2023  (KR) .................. 10-2023-0144389

(51) Int. Cl.
*H02H 7/20*    (2006.01)
*B60L 3/00*    (2019.01)
*H02H 1/00*    (2006.01)
*H02J 7/00*    (2006.01)

(52) U.S. Cl.
CPC .............. *H02H 7/20* (2013.01); *B60L 3/0007* (2013.01); *H02H 1/0007* (2013.01); *H02J 7/0031* (2013.01)

(58) Field of Classification Search
CPC ........... B60K 2001/0438; B60L 3/0007; B60L 3/0023; B60L 3/0038; B60L 3/0046;

(Continued)

(56) References Cited

U.S. PATENT DOCUMENTS 4,094,386 A    6/1978  Suzuki et al.
4,635,142 A *  1/1987  Haugland .............. H03K 5/082
                                              327/72

(Continued)

FOREIGN PATENT DOCUMENTS

CN    219446924 U  *  8/2023
JP    2003-9303 A     1/2003

(Continued)

OTHER PUBLICATIONS

Machine translation of Zhang et al. Chinese Patent Document CN 219446924 U Aug. 2023 (Year: 2023).*

(Continued)

*Primary Examiner* — Kevin J Comber
(74) *Attorney, Agent, or Firm* — Womble Bond Dickinson (US) LLP

(57) ABSTRACT

A vehicle impact detection device includes: an amplifier configured to receive and amplify an impact signal of a vehicle; a comparative voltage circuit configured to generate a first reference signal; a first comparator configured to output a control signal indicating that a predetermined first impact detection condition or a predetermined second impact detection condition is satisfied, based on an amplified signal output by the amplifier and the first reference signal; and a driver configured to cut off an output of a battery on basis of the control signal, wherein the comparative voltage circuit is configured to reduce a magnitude of the first reference signal over time in response to detection of the amplified signal output by the amplifier.

20 Claims, 10 Drawing Sheets

(58) Field of Classification Search
CPC .. B60L 3/0069; B60L 3/04; B60L 3/12; B60L 50/66; B60L 58/10; B60L 58/12; B60L 58/14; B60L 58/15; B60L 58/16; B60L 58/21; B60L 58/22; B60L 58/26; B60L 58/27; B60L 2240/545; B60L 2240/547; B60L 2240/549; B60L 2240/662; B60L 2240/80; B60L 2270/20; B60R 16/0231; B60R 21/013; B60R 21/0136; B60R 2021/01136; B60R 2021/01143; B60R 2021/01156; B60Y 2200/91; G01M 7/08; G01M 17/007; G01M 99/00; G01M 99/005; G01M 99/008; G01P 15/0891; G01R 31/382; H01M 10/486; H01M 50/249; H01M 2010/4271; H01M 2010/4278; H01M 2220/20; H02H 1/0007; H02H 3/087; H02H 7/18; H02H 7/20; H02J 7/0014; H02J 7/0031; H02J 7/0048
USPC .......................................................... 361/86
See application file for complete search history.

(56) References Cited

U.S. PATENT DOCUMENTS

| | | | | |
|---|---|---|---|---|
| 4,866,300 | A | * | 9/1989 | Bolk .................. G06G 7/25 327/72 |
| 2002/0195290 | A1 | * | 12/2002 | Hayakawa ............... B60L 3/04 180/277 |
| 2006/0250262 | A1 | | 11/2006 | Song |
| 2009/0189645 | A1 | * | 7/2009 | Hung .................. H03K 3/02337 327/37 |
| 2015/0175002 | A1 | * | 6/2015 | Lee .......................... B60L 3/12 701/36 |
| 2017/0141710 | A1 | | 5/2017 | Klopfenstein et al. |

FOREIGN PATENT DOCUMENTS

| | | | | |
|---|---|---|---|---|
| JP | 3399477 | B2 | * | 4/2003 |
| JP | 2015-47917 | A | | 3/2015 |
| KR | 100188648 | B1 | * | 6/1999 .......... B60R 21/013 |
| KR | 20020065147 | A | * | 8/2002 |
| KR | 10-0801852 | B1 | | 2/2008 |
| KR | 10-1926929 | B1 | | 12/2018 |

OTHER PUBLICATIONS

Machine translation of Chai Korean Patent Document KR 10-0188648 B1 Jun. 1999 (Year: 1999).*
Machine translation of Kim Korean Patent Document KR 2002-0065147 A Aug. 2002 (Year: 2002).*
Machine translation of Nakamura et al. Japanese Patent Document JP 3399477 B2 Apr. 2003 (Year: 2003).*
EPO Extended European Search Report dated Feb. 12, 2025, issued in corresponding European Patent Application No. 24193722.6, 24 pages.

* cited by examiner

VEHICLE IMPACT DETECTION DEVICE

CROSS REFERENCE TO RELATED APPLICATION

The present application claims priority to and the benefit of Korean Patent Application No. 10-2023-0144389, filed on Oct. 26, 2023, in the Korean Intellectual Property Office, the entire disclosure of which is incorporated herein by reference.

BACKGROUND

1. Field

Aspects of some embodiments of the present disclosure relate to a vehicle impact detection device, a vehicle impact detection method, and a vehicle including the vehicle impact detection device.

2. Description of the Related Art

Unlike primary batteries that are not designed to be repeatedly charged and discharged, secondary (or rechargeable) batteries are batteries that are designed to be repeatedly discharged and recharged. Low-capacity secondary batteries are used in portable, small electronic devices, such as smart phones, feature phones, notebook computers, digital cameras, and camcorders, while large-capacity secondary batteries may be used as power sources for driving motors in hybrid vehicles and electric vehicles and for storing power (e.g., home and/or utility scale power storage). A secondary battery generally includes an electrode assembly including a positive electrode and a negative electrode, a case accommodating the same, and electrode terminals connected to the electrode assembly.

The above information disclosed in this Background section is only for enhancement of understanding of the background and therefore the information discussed in this Background section does not necessarily constitute prior art.

SUMMARY

In a secondary battery provided in an electric vehicle, when an external impact is applied to the electric vehicle (e.g., due to a collision, etc.), the high voltage/high current of the secondary battery may cause human injury. To prevent or reduce such a risk, it may be desirable to provide an impact detection circuit that may detect an external impact applied to an electric vehicle to cut off the output of the battery.

For example, external impacts applied to an electric vehicle may have different directions, intensities, types, and the like, and thus a plurality of impact detection conditions may be set to detect whether an impact has occurred. In this case, it may be desirable for the impact detection circuit to perform the detection by distinguishing the impact detection conditions.

Aspects of some embodiments include a vehicle impact detection device that determines whether a plurality of impact detection conditions are satisfied by reducing the magnitude of a reference signal over time and cutting off the output of a battery.

However, the technical problem to be solved by the present disclosure is not limited to the above problem, and other problems not mentioned herein, and aspects and features of the present disclosure that would address such problems, will be clearly understood by those skilled in the art from the description of the present disclosure below.

According to some embodiments of the present disclosure, a vehicle impact detection device includes: an amplifier configured to receive and amplify an impact signal of a vehicle; a comparative voltage circuit configured to generate a first reference signal; a first comparator configured to output a control signal indicating that a predetermined first impact detection condition or a predetermined second impact detection condition is satisfied, on the basis of an amplified signal output by the amplifier and the first reference signal; and a driver configured to cut off an output of a battery on the basis of the control signal, wherein the comparative voltage circuit is configured to reduce the magnitude of the first reference signal over time in response to detection of the amplified signal output by the amplifier.

According to one or more embodiments of the present disclosure, the first impact detection condition may be a condition in which the impact signal is maintained at a first magnitude or more for a first time or more, the second impact detection condition may be a condition in which the impact signal is maintained at a second magnitude or more for a second time or more, and the first magnitude may be greater than the second magnitude, and the first time is shorter than the second time.

According to one or more embodiments of the present disclosure, the comparative voltage circuit may include: a constant voltage source; and a switch. The switch may be configured to cut off the constant voltage source in response to the detection of the amplified signal.

According to one or more embodiments of the present disclosure, the comparative voltage circuit may further include at least one resistor and at least one capacitor. In a case where the constant voltage source is cut off, the first reference signal stored in the at least one capacitor may be discharged via the at least one resistor to reduce the magnitude of the first reference signal over time.

According to one or more embodiments of the present disclosure, an initial magnitude and a drop rate over time of the first reference signal may be determined on the basis of the first impact detection condition and the second impact detection condition.

According to one or more embodiments of the present disclosure, the initial magnitude of the first reference signal may be greater than a first amplified signal magnitude of the first magnitude, and the drop rate over time of the first reference signal may increase with decreases in the second magnitude.

According to one or more embodiments of the present disclosure, the initial magnitude of the first reference signal may be greater than a first amplified signal magnitude of the first magnitude, and the drop rate over time of the first reference signal may decrease with increases in the difference between the first time and the second time.

According to one or more embodiments of the present disclosure, the first comparator may be configured to output the control signal in response to determination that the amplified signal is greater than the first reference signal.

According to one or more embodiments of the present disclosure, in a case where the first comparator determines the amplified signal to be greater than the first reference signal at a first time point after the magnitude of the first reference signal has begun to decrease, the first impact detection condition may be detected, and the first time point may be a time point that has passed the first time and has not passed the second time after the magnitude of the first reference signal has begun to decrease.

According to one or more embodiments of the present disclosure, in a case where the first comparator determines the amplified signal to be greater than the first reference signal at a second time point after the magnitude of the first reference signal has begun to decrease, the second impact detection condition may be detected, and the second time point may be a time point that has passed the second time after the magnitude of the first reference signal has begun to decrease.

According to one or more embodiments of the present disclosure, the vehicle impact detection device may further include a latch configured to receive the control signal and transmit a sustain signal maintaining the control signal to the driver.

According to one or more embodiments of the present disclosure, the vehicle impact detection device may further include a low-pass filter between the amplifier and the first comparator.

According to one or more embodiments of the present disclosure, the vehicle impact detection device may further include a second comparator configured to compare the amplified signal and a second reference signal. The magnitude of the second reference signal may be smaller than the magnitude of the first reference signal, and the driver may be configured to cut off an output of the battery on the basis of a number of times by which the amplified signal output by the amplifier is determined to be greater than the second reference signal.

According to one or more embodiments of the present disclosure, a first number of times by which the amplified signal output by the amplifier is determined to be greater than the first reference signal and a second number of times by which the amplified signal output by the amplifier is determined to be greater than the second reference signal may be transferred to an external device, and whether the vehicle or the vehicle impact detection device has reached an end of a life time thereof may be determined on the basis of the first number of times and the second number of times.

According to one or more embodiments of the present disclosure, the vehicle impact detection device may further include a resistor. The impact signal may be generated by an impact current passing through the resistor, the impact current being generated in response to an impact being applied to the vehicle.

According to some embodiments of the present disclosure, a vehicle impact detection method includes: receiving an impact signal of a vehicle and generating an amplified signal by an amplifier; generating a first reference signal by a comparative voltage circuit; determining whether a predetermined first impact detection condition or a predetermined second impact detection condition is satisfied by a comparator, on the basis of the amplified signal and the first reference signal; and outputting, by the comparator, a control signal to cut off an output of a battery, in response to the determination that the predetermined first impact detection condition or the predetermined second impact detection condition is satisfied, wherein the magnitude of the first reference signal decreases over time in response to the comparative voltage circuit detecting the amplified signal output by the amplifier.

According to one or more embodiments of the present disclosure, the vehicle impact detection method may further include cutting off the output of the battery by a driver, on the basis of the control signal.

According to one or more embodiments of the present disclosure, the first impact detection condition may be a condition in which the impact signal is maintained at a first magnitude or more for a first time or more. The second impact detection condition may be a condition in which the impact signal is maintained at a second magnitude or more for a second time or more. The first magnitude may be greater than the second magnitude, and the first time may be shorter than the second time.

A vehicle according to one or more embodiments of the present disclosure includes the vehicle impact detection device.

According to one or more embodiments of the present disclosure, the vehicle includes: an electronic control unit (ECU) configured to generate an impact current in response to an impact applied to the vehicle; a battery configured to supply drive power of the vehicle; and a battery management system associated with the battery, wherein the battery management system includes the vehicle impact detection device.

According to some embodiments of the present disclosure, the occurrence of a fire or the like which may be caused by an impact with a threshold intensity or more applied to a battery pack may be prevented or reduced.

According to some embodiments of the present disclosure, a plurality of impact detection conditions may be set in response to various types of external impacts and the environment of a vehicle, whereby a problem in which the output of the battery pack is not cut off due to no impact being detected even in a case where an external impact has occurred may be prevented or reduced, or different response methods may be applied to various types of impacts.

According to some embodiments the present disclosure, whether a plurality of shock detection conditions are satisfied may be determined by reducing the magnitude of a reference signal over time.

According to some embodiments of the present disclosure, even in a case where the impact signal is smaller than the normal magnitude due to the aging of the vehicle or internal abnormalities of the vehicle when an impact having a predetermined magnitude or more is applied to the vehicle, the output of the battery may be cut off or whether the vehicle or the vehicle impact detection device has reached the end of the service life may be determined, thereby inducing the replacement of the vehicle or the vehicle impact detection device.

However, aspects and features of the present disclosure are not limited to those described above, and other aspects and features not mentioned will be clearly understood by a person skilled in the art from the detailed description, described below.

BRIEF DESCRIPTION OF DRAWINGS

The following drawings attached to this specification illustrate aspects of some embodiments of the present disclosure, and further describe aspects and features of some embodiments of the present disclosure together with the detailed description of the present disclosure. Thus, embodiments according to the present disclosure should not be construed as being limited to the drawings.

DETAILED DESCRIPTION

Figure 1:
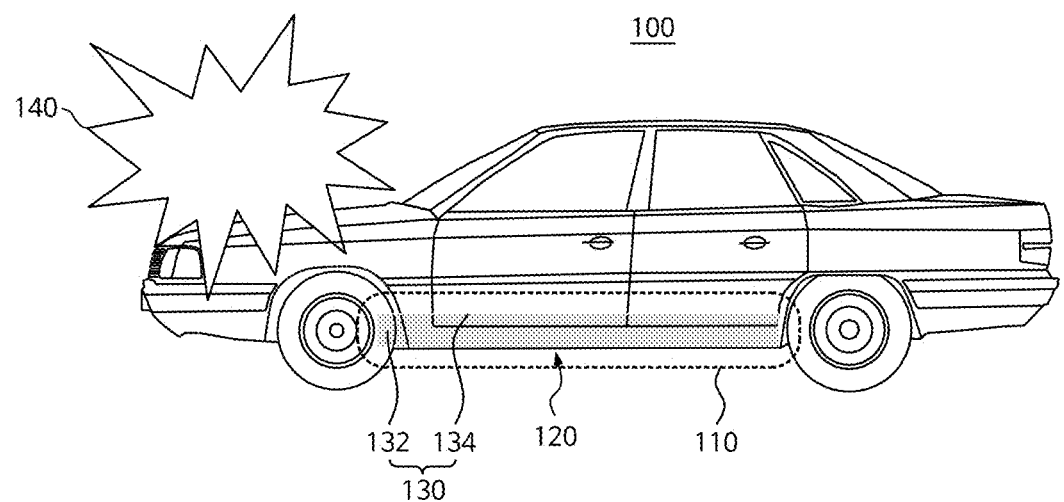
FIG. 1 illustrates an example in which an external impact is applied to a vehicle including a battery pack according to one or more embodiments of the present disclosure.

Hereinafter, aspects of some embodiments of the present disclosure will be described in more detail, with reference to the accompanying drawings. The terms or words used in the present specification and claims are not to be limitedly interpreted as general or dictionary meanings and should be interpreted as meanings and concepts that are consistent with the technical idea of the present disclosure on the basis of the principle that an inventor can be his/her own lexicographer to appropriately define concepts of terms to describe his/her invention in the best way.

The embodiments described in this specification and the configurations shown in the drawings are only some of the embodiments of the present disclosure and do not represent all of the technical spirit, aspects, and features of the present disclosure. Accordingly, it should be understood that there may be various equivalents and modifications that can replace or modify the embodiments described herein at the time of filing this application.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C," "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may be arranged in contact with the upper (or lower) surface of the element, and another element may also be interposed between the element and the arbitrary element arranged on (or under) the element.

In addition, it will be understood that when a component is referred to as being "linked," "coupled," or "connected" to another component, the elements may be directly "coupled," "linked" or "connected" to each other, or another component may be "interposed" between the components".

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

A battery pack according to one or more embodiments includes at least one battery module and a pack housing having an accommodation space in which the at least one battery module is accommodated.

The battery module may include a plurality of battery cells and a module housing. The battery cells may be accommodated inside the module housing in a stacked form (or stacked arrangement or configuration). Each battery cell may have a positive electrode terminal and a negative electrode terminal and may be a circular type, a prismatic type, or a pouch type according to the shape of battery. In the present specification, a battery cell may also be referred to as a secondary battery, a battery, or a cell.

In the battery pack, one cell stack may constitute one module stacked in place of the battery module. The cell stack may be accommodated in an accommodation space of the pack housing or may be accommodated in an accommodation space partitioned by a frame, a partition wall, etc.

The battery cell may generate a large amount of heat during charging/discharging. The generated heat may be accumulated in the battery cell, thereby accelerating the deterioration of the battery cell. Accordingly, the battery pack may further include a cooling member to remove the generated heat and thereby suppress deterioration of the battery cell. The cooling member may be provided at the bottom of the accommodation space at where the battery cell is provided but is not limited thereto and may be provided at the top or side depending on the battery pack.

The battery cell may be configured such that exhaust gas generated inside the battery cell under abnormal operating conditions, also known as thermal runaway or thermal events, is discharged to the outside of the battery cell. The battery pack or the battery module may include an exhaust port for discharging the exhaust gas to prevent or reduce damage to the battery pack or module by the exhaust gas.

The battery pack may include a battery and a battery management system (BMS) for managing the battery. The battery management system may include a detection device, a balancing device, and a control device. The battery module may include a plurality of cells connected to each other in series and/or parallel. The battery modules may be connected to each other in series and/or in parallel.

The detection device may detect a state of a battery (e.g., voltage, current, temperature, etc.) to output state information indicating the state of the battery. The detection device may detect the voltage of each cell constituting the battery or of each battery module. The detection device may detect current flowing through each battery module constituting the battery module or the battery pack. The detection device may also detect the temperature of a cell and/or module on at least one point of the battery and/or an ambient temperature.

The balancing device may perform a balancing operation of a battery module and/or cells constituting the battery module. The control device may receive state information (e.g., voltage, current, temperature, etc.) of the battery module from the detection device. The control device may monitor and calculate the state of the battery module (e.g., voltage, current, temperature, state of charge (SOC), life span (state of health (SOH)), etc.) on the basis of the state information received from the detection device. In addition, on the basis of the monitored state information, the control device may perform a control function (e.g., temperature control, balancing control, charge/discharge control, etc.) and a protection function (e.g., over-discharge, over-charge, over-current protection, short circuit, fire extinguishing function, etc.). In addition, the control device may perform a wired or wireless communication function with an external device of the battery pack (e.g., a higher level controller or vehicle, charger, power conversion system, etc.).

The control device may control charging/discharging operation and protection operation of the battery. To this end, the control device may include a charge/discharge control unit, a balancing control unit, and/or a protection unit.

The battery management system is a system that monitors the battery state and performs diagnosis and control, communication, and protection functions, and may calculate the charge/discharge state, calculate battery life or state of health (SOH), cut off, as necessary, battery power (e.g., relay control), control thermal management (e.g., cooling, heating, etc.), perform a high-voltage interlock function, and/or may detect and/or calculate insulation and short circuit conditions.

A relay may be a mechanical contactor that is turned on and off by the magnetic force of a coil or a semiconductor switch, such as a metal oxide semiconductor field effect transistor (MOSFET).

The relay control has a function of cutting off the power supply from the battery if (or when) a problem occurs in the vehicle and the battery system and may include one or more relays and pre-charge relays at the positive terminal and the negative terminal, respectively.

In the pre-charge control, there is a risk of inrush current occurring in the high-voltage capacitor on the input side of the inverter when the battery load is connected. Thus, to prevent or reduce inrush current when starting a vehicle, the pre-charge relay may be operated before connecting the main relay and the pre-charge resistor may be connected.

The high-voltage interlock is a circuit that uses a small signal to detect whether all high-voltage parts of the entire vehicle system are connected and may have a function of forcibly opening a relay if (or when) an opening occurs at even one location on the entire loop.

FIG. 1 illustrates an example in which an external impact 140 is applied to a vehicle 100 including a battery pack 130 according to one or more embodiments of the present disclosure. FIG. 1 shows a vehicle body and vehicle body parts having a battery pack 130 according to one or more embodiments of the present disclosure.

A battery pack 130 may include a battery pack cover 134, which is a part of a vehicle underbody 120, and a pack frame 132 located under the vehicle underbody 120. The pack frame 132 and the battery pack cover 134 may be integrally formed with a vehicle floor 110. The vehicle underbody 120 separates the inside and outside of a vehicle, and the pack frame 132 may be located outside the vehicle. A vehicle 100 may be formed by combining additional parts, such as a hood in front of the vehicle and fenders respectively located in the front and rear of the vehicle to a vehicle body. In a case where the external impact 140 is applied to the vehicle 100, an electronic control unit (ECU) of the vehicle 100 may generate an impact current. Herein, the external impact 140 may vary depending on the speed of the vehicle 100 at the time of impact, a target object to be impacted, and the like, and the impact current may vary accordingly. For example, a greater amount of impact applied to the vehicle 100 may result in a greater impact current.

In addition, the impact current may occur during the time that the vehicle 100 is being impacted. For example, assuming that the vehicle 100 is impacted for 2 milliseconds (ms) and the amount of impact at a particular point in time gradually decreases from the maximum amount of impact immediately after the initial impact, the impact current may be generated for 2 ms, with the magnitude thereof gradually decreasing.

According to some embodiments, the battery pack 130 may include a vehicle impact sensing device. For example, the vehicle impact sensing device may be included in a battery management system (BMS) of the battery pack. In response to the external impact 140 being applied to the vehicle 100, the impact current generated by the ECU of the vehicle 100 may be transferred to the vehicle impact sensing device of the battery pack 130.

The vehicle impact detection device may determine whether an impact signal of the vehicle satisfies an impact detection condition (e.g., a set or predetermined impact detection condition). Herein, the impact signal of the vehicle may be generated as the impact current generated in response to the impact being applied to the vehicle passes through a resistance of the vehicle impact detection device. The impact detection condition (e.g., the set or predetermined impact detection condition) may include one or more of a plurality of conditions.

In response to the impact signal of the vehicle being determined to satisfy the impact detection condition (e.g., the set or predetermined impact detection condition), the output of the battery pack 130 may be cut off. In this manner, a fire or the like that may occur in response to the impact of the threshold magnitude or more being applied to the battery pack 130 may be prevented or reduced.

Figure 2:
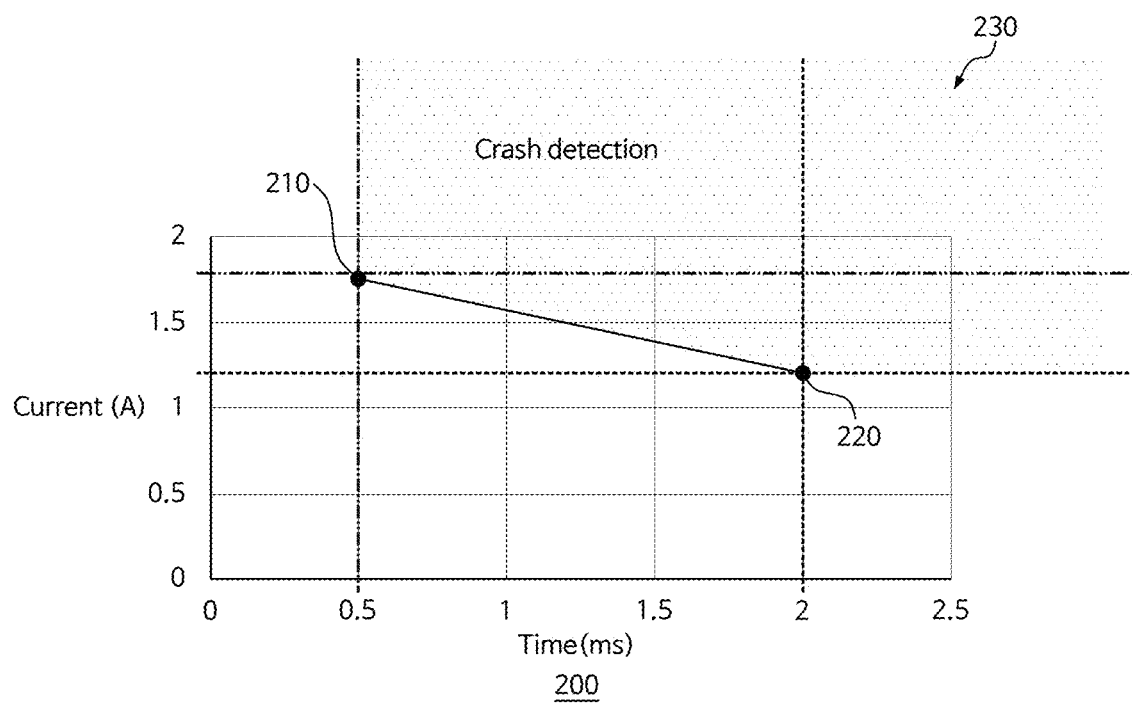
FIG. 2 illustrates an example of a plurality of impact detection conditions according to one or more embodiments of the present disclosure.

FIG. 2 illustrates a diagram showing an example of a plurality of impact detection conditions according to one or more embodiments of the present disclosure. The external impact applicable to the vehicle may vary in direction, strength, type, and the like. In addition, the impact current generated in response to the external impact may vary depending on the environment in which the vehicle is placed (e.g., a specific temperature, humidity, etc.). Thus, by establishing a plurality of impact detection conditions in response to various types of external impacts and environments of the vehicle, the problem that the output of the battery pack is not cut off because no impact is detected may be prevented or reduced even after an external impact occurred. In another example, different countermeasures may be applied for different types of impacts by setting a plurality of impact detection conditions.

According to some embodiments, in a case where the impact signal of the vehicle generated in response to the external impact satisfies any one of the impact detection conditions (e.g., the set or predetermined impact detection conditions), the vehicle may be determined to be impacted and the output of the battery may be cut off. For example, in the two impact detection conditions, the first impact detection condition may be a condition in which the impact signal is maintained at a first magnitude or more for a first time or more, and the second impact detection condition may be a condition in which the impact signal is maintained at a second magnitude or more for a second time or more. In these conditions, the first magnitude may be greater than the second magnitude, and the first time may be shorter than the second time.

In the example shown in FIG. 2, the first impact detection condition may be a condition in which the impact signal is maintained at 1.75 A or more for 0.5 ms or more. In addition, the second impact detection condition may be a condition in which the impact signal is maintained at 1.25 A or more for 2 ms or more. An impact detection range 230 may be determined on the basis of a first critical point 210 (associated with the first impact detection condition) at which an impact signal 1.75 A is maintained for 0.5 ms and a second critical point 220 (associated with the second impact detection condition) at which an impact signal 1.25 A is maintained for 2 ms or more. In response to the determination that the impact signal is positioned within the impact detection range 230, the impact on the vehicle may be detected. That is, in a case where the reference signal is configured to decrease over time like a line connecting the first critical point 210 and the second critical point 220, whether two impact detection conditions are satisfied may be detected using a single reference signal. This will be described below with reference to FIGS. 3 to 5.

Figure 3:
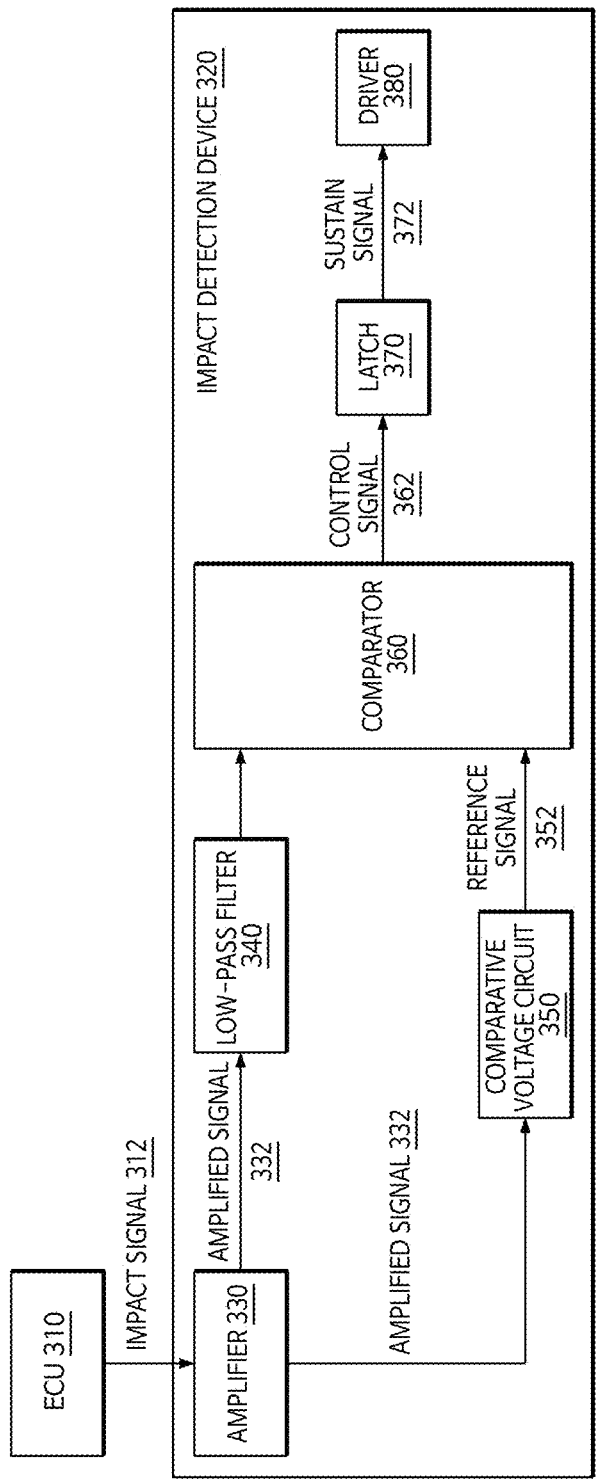
FIG. 3 illustrates an example of an impact detection device according to one or more embodiments of the present disclosure.

FIG. 3 illustrates an example of an impact detection device 320 according to one or more embodiments of the present disclosure. An ECU 310 may generate an impact signal 312 in response to an impact on the vehicle. The impact signal 312 generated by the ECU 310 may be transferred to the impact detection device 320 (or an amplifier 330).

The amplifier 330 may be configured to amplify the impact signal 312 to output an amplified signal 332. The amplified signal 332 output by the amplifier 330 may be transferred to a low-pass filter 340 and a comparative voltage circuit 350.

The amplified signal 332 may input to a comparator 360 after having passed through the low-pass filter 340. The low-pass filter 340 may include a resistor and a capacitor. The signal input to the comparator 360 after having passed through the low-pass filter 340 may exceed a reference signal 352 at different time points depending on the characteristics of the resistor and the capacitor and depending on the magnitude of the impact signal 312. This will be described in more detail below with reference to FIG. 5.

In addition, the amplified signal 332 output by the amplifier 330 may be input to the comparative voltage circuit 350. The comparative voltage circuit 350 may generate the reference signal 352 with which the amplified signal that has passed through the low-pass filter 340 is to be compared. The reference signal 352 generated by the comparative voltage circuit 350 may be held at a constant value prior to the reception of the amplified signal 332. Upon receiving the amplified signal 332, the comparative voltage circuit 350 may begin to reduce the reference signal 352. This will be described in more detail below with reference to FIG. 4.

According to some embodiments, the comparator 360 may compare the amplified signal having passed through the low-pass filter 340 with the reference signal 352 to determine whether or not an impact detection condition (e.g., a set or predetermined impact detection condition) is satisfied. For example, in a case where the amplified signal having passed through the low-pass filter 340 is greater than the reference signal 352, the comparator 360 may determine that the impact detection condition (e.g., the set or predetermined impact detection condition) is satisfied. In this case, the comparator 360 may output a control signal 362 indicating that the impact detection condition is satisfied.

According to some embodiments, a latch 370 may be located between the comparator 360 and a driver 380 in order to maintain the control signal 362. The latch 370 may receive the control signal 362 as an input, generate a sustain signal 372 maintaining the control signal, and transfer the sustain signal 372 to the driver 380. The driver 380 may cut off the output of the battery while receiving the sustain signal 372.

Figure 4:
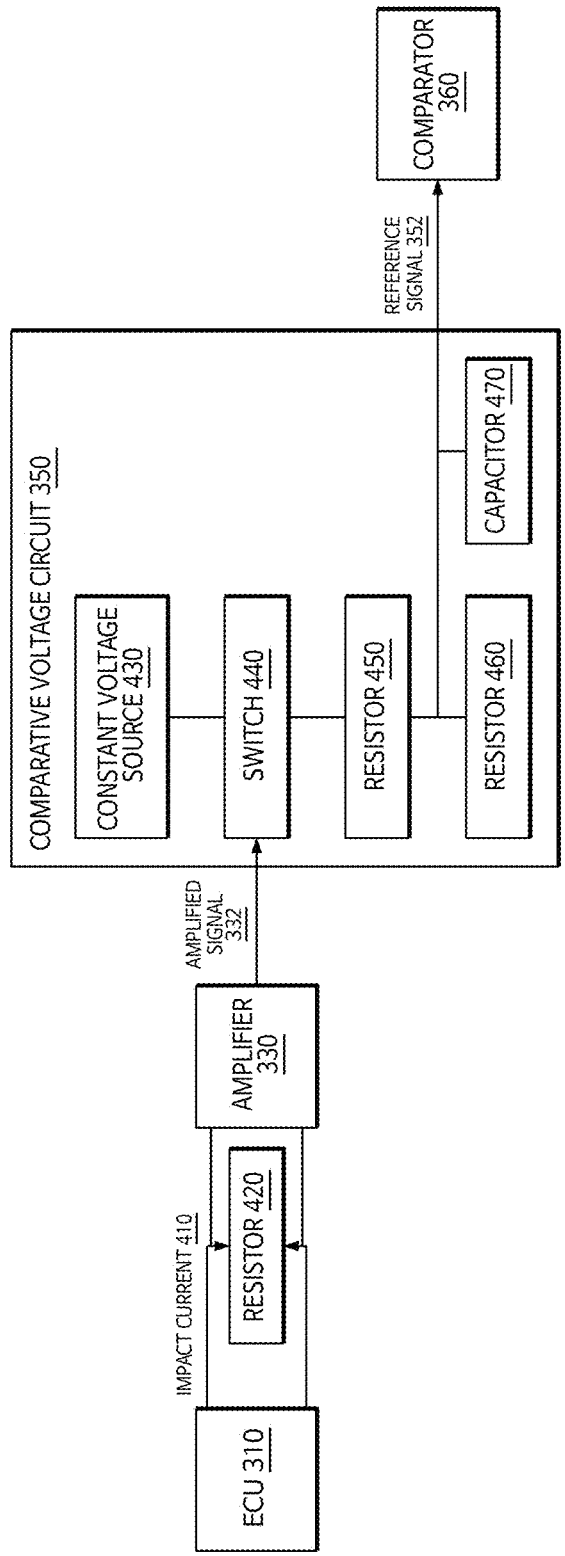
FIG. 4 illustrates a specific configuration of the comparative voltage circuit according to one or more embodiments of the present disclosure.

FIG. 4 illustrates a configuration of the comparative voltage circuit 350 according to one or more embodiments of the present disclosure. Regarding the components, such as the ECU 310, the amplifier 330, the amplified signal 332, the reference signal 352, and the comparator 360, the same as those illustrated in FIG. 3, a description of the features described above with reference to FIG. 3 will be omitted.

The ECU 310 may generate an impact current 410 in response to an external impact applied to the vehicle. In this case, the impact current 410 may be converted to an impact signal (e.g., a voltage value) by the resistor 420.

The comparative voltage circuit 350 may include a constant voltage source 430, a switch 440 connecting/disconnecting the constant voltage source 430, resistors 450 and 460, and a capacitor 470. The comparative voltage circuit 350 may be configured to reduce the magnitude of the reference signal 352 over time in response to the detection of the amplified signal 332 output by the amplifier 330.

For example, the amplified signal 332 output by the amplifier 330 may be transferred to the switch 440 of the comparative voltage circuit 350. The switch 440 may be configured to cut off the constant voltage source 430 in response to the detection/reception of the amplified signal 332. In a case where the constant voltage source 430 is cut off by the switch 440, the reference signal 352 stored in the capacitor 470 may be discharged through the resistors 450 and 460, thereby reducing the magnitude of the reference signal 352 over time. The degree by which the reference signal 352 is reduced may be adjusted through the values of the resistors 450 and 460 and the capacitor 470.

The comparative voltage circuit 350 is illustrated in FIG. 4 as including the two resistors 450 and 460 and the single capacitor 470, but the present disclosure is not limited thereto. For example, the comparative voltage circuit 350 may include one or more resistors and one or more capacitors. In addition, the number of the resistors, the number of the capacitors, the value of the resistors, the capacitance of the capacitors, and the like may vary depending on the impact detection condition or the like.

Figure 5:
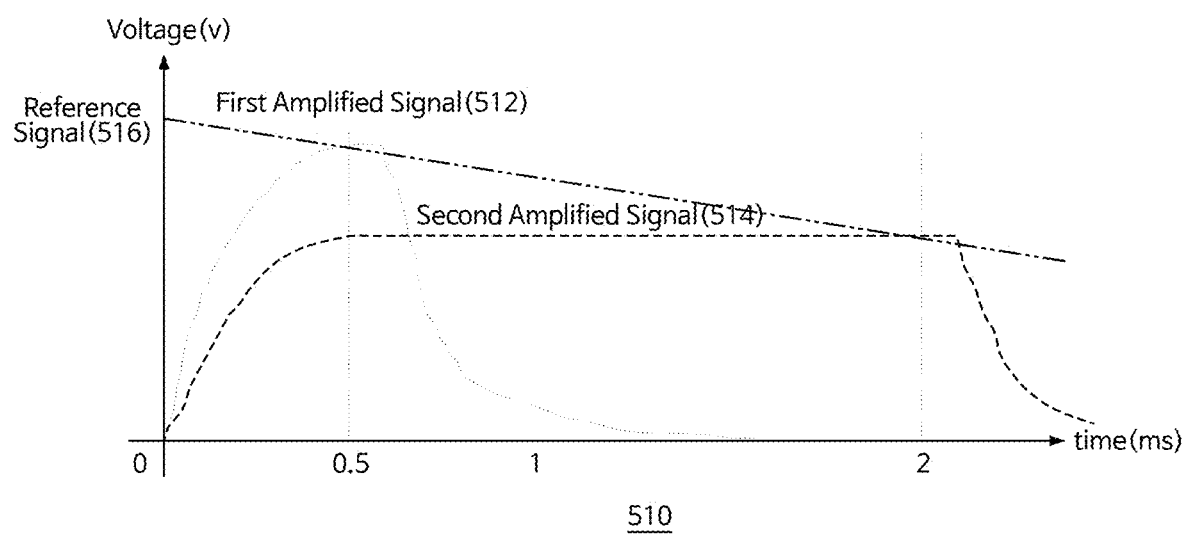
FIG. 5 illustrates an example in which a control signal is output on the basis of amplified signals and a reference signal of the vehicle impact detection device according to one or more embodiments of the present disclosure.
Figure 5:
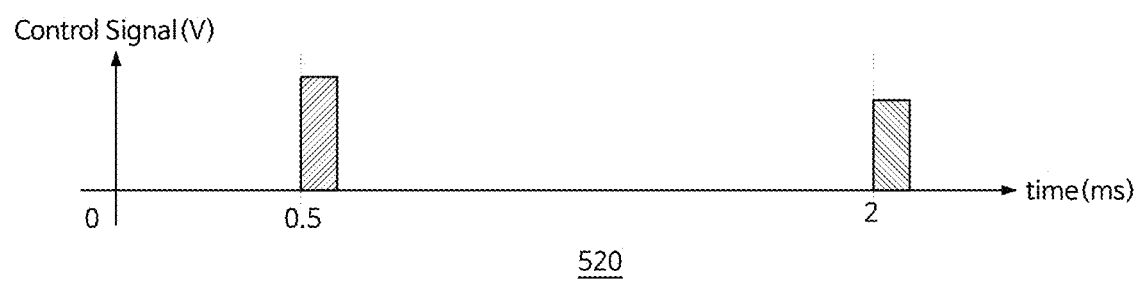

FIG. 5 illustrates a diagram showing an example in which a control signal is output on the basis of amplified signals 512 and 514 and a reference signal 516 of the vehicle impact detection device according to one or more embodiments of the present disclosure. A second graph 520 represents a control signal generated on the basis of the amplified signals 512 and 514 of the first graph 510 and the reference signal 516, and the time axes on the first graph 510 and the second graph 520 correspond to each other.

The amplified signals 512 and 514, the reference signal 516, and the control signal may be signals generated by the impact detection device 320 according to FIGS. 3 and 4. That is, the reference signal 516 may be a signal generated by the constant voltage source of the comparative voltage circuit and decreasing in response to the switch detecting an amplified signal. In addition, the amplified signals 512 and 514 may be amplified signals generated from an impact signal of the vehicle and having passed through the low-pass filter, i.e., the amplified signals input to the comparator.

The first amplified signal 512 and the second amplified signal 514 may be depicted as occurring simultaneously on the same graph in order to illustrate that the vehicle impact detection device may detect an impact by distinguishing between different impact detection conditions having different time conditions. In an actual environment, only one of the first amplified signal 512 and the second amplified signal 514 may occur.

In response to the comparator determining that the amplified signals 512 and 514 are greater than the reference signal 516, a control signal on the second graph 520 may be output. As illustrated in the figure, as the first amplified signal 512 increases to be greater than the reference signal 516 at about 0.5 ms, a control signal may be output. For example, the first amplified signal 512 may satisfy the first impact detection condition in which the impact signal is maintained at 1.75 A or more for 0.5 ms or more. In addition, at about 2 ms, as the second amplified signal 514 increases to be greater than the reference signal 516, a control signal may be output. For example, the second amplified signal 514 may satisfy the second impact detection condition in which the impact signal is maintained at 1.25 A or more for 2 ms or more.

The amplified signals 512 and 514 of the first graph 510 represent amplified signals satisfying a plurality of impact detection conditions (e.g., a set or predetermined plurality of impact detection conditions). In a case where the reference signal 516 is the same, even in a case where the actual amplified signal is greater or maintained for a longer period of time than the first amplified signal 512 or the second amplified signal 514, it is apparent that an interval in which the amplified signal is greater than the reference signal 516 occurs, and a control signal may be generated. In another case where the amplified signal is smaller or maintained for a shorter period of time than the first amplified signal 512 or the second amplified signal 514 illustrated, an interval in which the amplified signal is greater than the reference signal 516 does not occur, and a control signal is not generated.

In a case where the impact detection condition (e.g., the set or predetermined impact detection) condition is different or changed, the initial magnitude and drop rate of the reference signal may change. For example, in a case where the impact detection condition associated with the second amplified signal 514 is changed to require a shorter hold time, it is desirable for the initial magnitude and drop rate of the reference signal 516 to increase so that both the impact detection conditions associated with the first amplified signal 512 and the second amplified signal 514 may be detected.

Summarizing the above, in a case where the first amplified signal 512 is determined to be greater than the reference signal 516 at a first time point after the magnitude of the reference signal 516 has begun to decrease, the first impact detection condition may have been detected. Herein, the first time point may be a time point that has passed a first time and has not passed a second time after the magnitude of the reference signal 516 has begun to decrease.

Similarly, in a case where the amplified signal is determined to be greater than the reference signal 516 at a second time point after the magnitude of the reference signal 516 has begun to decrease, the second impact detection condition may have been detected. Herein, the second time point may be a time point that has passed the second time after the magnitude of the first reference signal has begun to decrease.

In addition, the initial magnitude and the drop rate over time of the reference signal 516 may be determined on the basis of the impact detection conditions. According to some embodiments, the initial magnitude of the reference signal 516 may be greater than a first amplified signal magnitude of the first impact detection condition, and the drop rate over time of the reference signal 516 may increase with decreases in the second magnitude. According to some embodiments, the initial magnitude of the first reference signal may be greater than the first amplified signal magnitude of the first impact detection condition, and the lower the drop rate over time of the reference signal 516 may decrease with increases in the difference between the first time and the second time.

With this configuration, different impact detection conditions (e.g., the first impact detection condition and the second impact detection condition) may be detected using only a single comparator instead of using two comparators. Therefore, the manufacturing cost of the impact detection device capable of detecting different impact detection conditions may be reduced.

Figure 6:
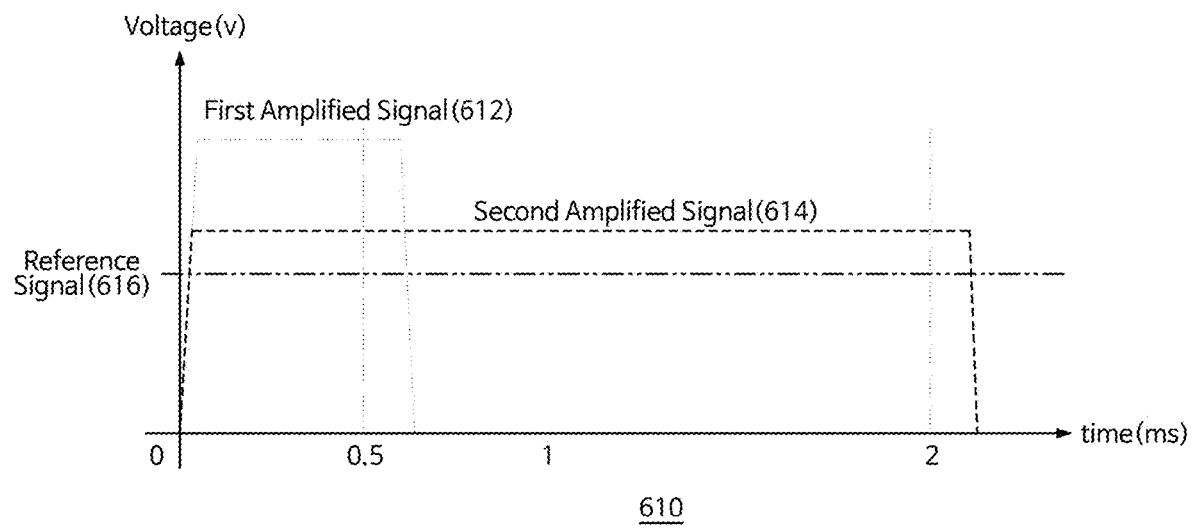
FIG. 6 illustrates a comparative example of the vehicle impact detection device in which no low-pass filter is provided and a constant reference signal is used according to one or more embodiments of the present disclosure.
Figure 6:
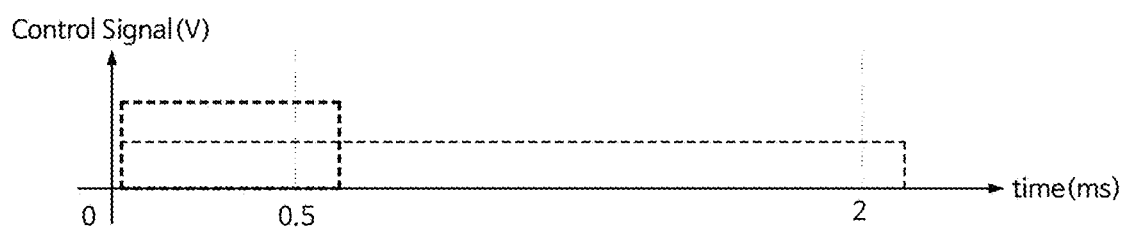

FIG. 6 illustrates a comparative example of the vehicle impact detection device in which no low-pass filter is provided and a constant reference signal 616 is used according to one or more embodiments of the present disclosure. The second graph 620 represents a control signal generated on the basis of the amplified signals 612 and 614 and a reference signal 616 of the first graph 610, and the time axes on the first graph 610 and the second graph 620 correspond to each other. Although the first amplified signal 612 and the second amplified signal 614 are illustrated occurring together on the same graph for illustrative purposes, in an actual environment, one of the first amplified signal 612 and the second amplified signal 614 may occur.

It may be seen that the waveform of the amplified signal in the first graph 610 with no low-pass filter is different from the waveform of the amplified signal in FIG. 5 with the low-pass filter. It may also be seen that the reference signal 616 is constant in the first graph 610, unlike FIG. 5. Due to this difference, in the second graph 620, the control signal may be generated immediately after the impact occurs. For example, a control signal may be generated at a time point at which the first amplified signal 612 is greater than the reference signal 616 (about 0.05 ms). Thus, at a time point at which the first amplified signal 612 does not satisfy the first impact detection condition of being maintained at 1.75 A or more for 0.5 ms or more, a control signal may be generated. Similarly, a control signal may be generated at a time point (about 0.05 ms) at which the second amplified signal 614 is greater than the reference signal 616. Thus, at a time point at which the second amplified signal 614 does not satisfy the second impact detection condition of maintaining above 1.25 A or more for 2 ms or more, a control signal may be generated. That is, the vehicle impact detection device without the low-pass filter in FIG. 6 and using the constant reference signal may not detect different impact detection conditions requiring the impact signal to be maintained for more than a certain time.

Figure 7:
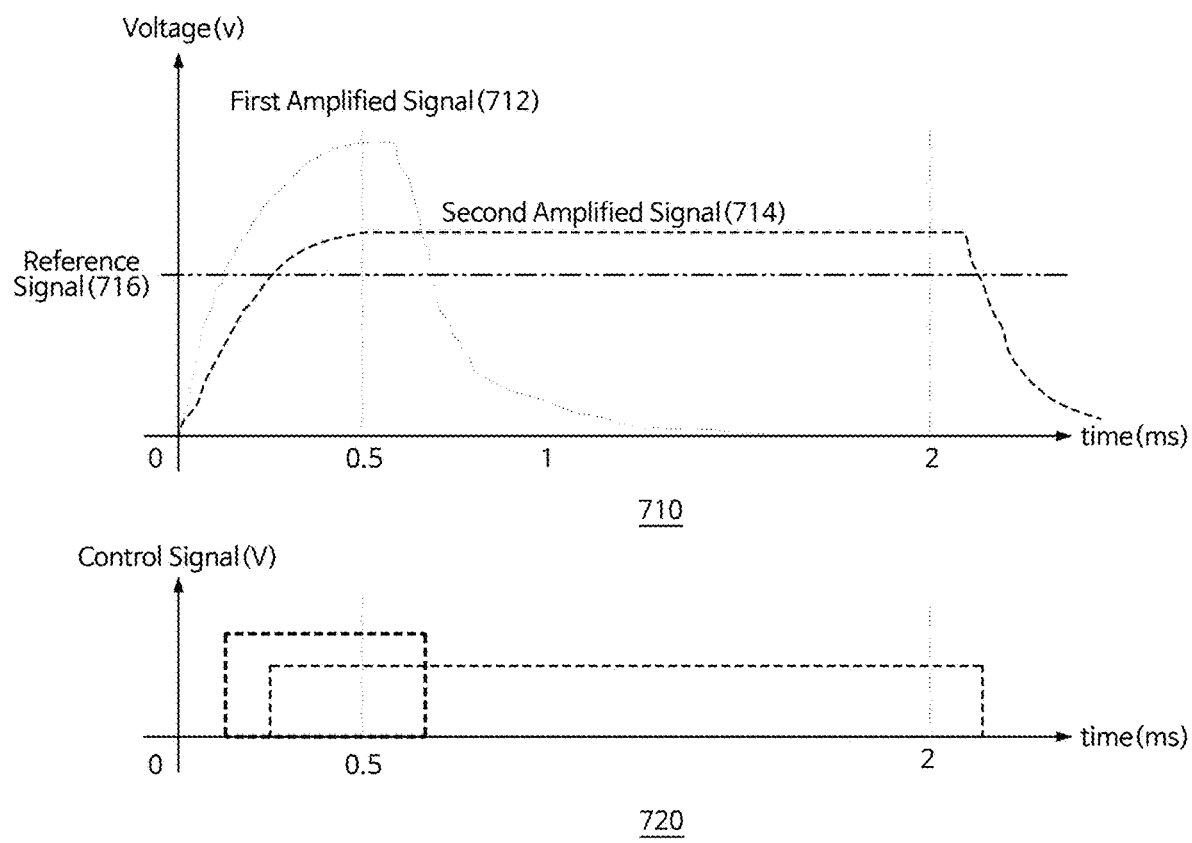
FIG. 7 illustrates a comparative example of the vehicle impact detection device in which a switch disconnecting the constant voltage source is not provided according to one or more embodiments of the present disclosure.

FIG. 7 illustrates a comparative example of the vehicle impact detection device in which a switch disconnecting the constant voltage source is not provided according to one or more embodiments of the present disclosure. The second graph 720 represents a control signal generated on the basis of amplified signals 712 and 714 and a reference signal 716 of a first graph 710, and the time axes on the first graph 710 and the second graph 720 correspond to each other. Although the first amplified signal 712 and the second amplified signal 714 are illustrated as occurring together on the same graph for illustrative purposes, in an actual environment, one of the first amplified signal 712 and the second amplified signal 714 may occur.

With no low-pass filter, it may be seen that the waveform of the amplified signal in the first graph 710 is the same as the waveform of the amplified signal in FIG. 5. However, unlike FIG. 5, it may be seen that the reference signal 716 in the first graph 710 is constant and does not decrease over time. Therefore, the second graph 720 also differs from the vehicle impact detection device in FIG. 5 in that the control signal is generated after a delay time after the impact occurs, and the impact is maintained for a time (e.g., a set or predetermined time) before the control signal is generated. For example, a control signal is generated at a time point (about 0.1 ms) at which the first amplified signal 712 is greater than the reference signal 716. Thus, at a time point at which the first amplified signal 712 does not satisfy the first impact detection condition of being maintained at 1.75 A or more for 0.5 ms or more, a control signal may be generated.

Similarly, a control signal may be generated at a time point (about 0.2 ms) at which the second amplified signal 714 is greater than the reference signal 716. Thus, at a time point at which the second amplified signal 714 does not satisfy the second impact detection condition of being maintained at 1.25 A or more for 2 ms or more, a control signal may be generated. In addition, with the low-pass filter being used, the time point at which the first impact detection condition is detected (e.g., 0.1 ms) and the time point at which the second impact detection condition is detected (e.g., 0.2 ms) may be different, but the required difference of 1.5 ms may not be satisfied. According to such a difference, the vehicle impact detection device in which the reference signal 716 in FIG. 7 does not decrease over time and is constant may not detect different impact detection conditions requiring the impact signal to be maintained for more than a certain period of time.

Figure 8:
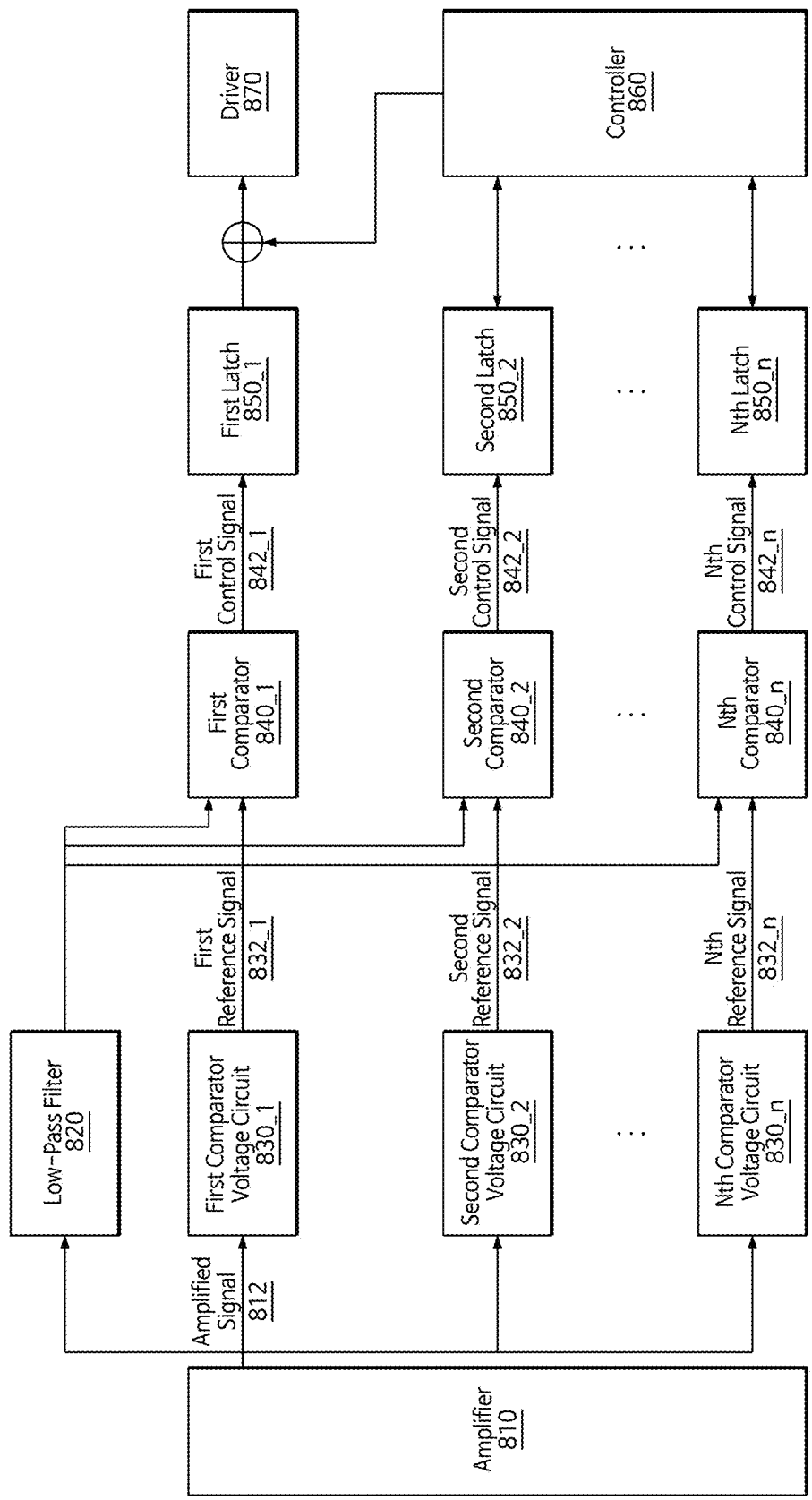
FIG. 8 illustrates a vehicle impact detection device using a controller unit according to one or more embodiments of the present disclosure.

FIG. 8 illustrates the vehicle impact detection device further using a controller 860 according to one or more embodiments of the present disclosure. Regarding each of an amplifier 810, an amplified signal 812, a low-pass filter 820, comparator voltage circuit portions 830_1 to 830_n, comparators 840_1 to 840_n outputting control signals 842_1 to 842_n, latches 850_1 to 850_n outputting sustain signals, and a driver 870 cutting off the output of the battery, a description of the features the same as those described above with reference to FIGS. 3 and 4 will be omitted.

The illustrated vehicle impact detection device may generate a plurality of reference signals 832_1 to 832_n by providing the comparative voltage circuit portions 830_1 to 830_n. Assuming that the impact detection condition of the vehicle impact detection device in FIG. 8 is the same as the impact detection condition of the vehicle impact detection device in FIG. 3, the first reference signal 832_1 may correspond to the reference signal 352 in FIG. 3. That is, the initial magnitude and drop rate of the first reference signal 832_1 may be the same as the initial magnitude and drop rate of the reference signal 352 in FIG. 3 associated with the impact detection condition (e.g., the set or predetermined impact detection condition). In another example, the magnitude of the second reference signal 832_2 may be smaller than the first reference signal 832, and the magnitude of the nth reference signal, i.e., the nth reference signal 832_n, may be smaller than the (n−1)th reference signal. That is, a plurality of gradually decreasing reference signals may be generated. The second to nth reference signals 832_2 to 832_n may decrease in magnitude over time, similarly to the first reference signal 832_1.

According to some embodiments, the first comparator 840_1 may determine that an impact detection condition (e.g., a set or predetermined impact detection condition) is satisfied in a case where the amplified signal passed through the low-pass filter 820 is greater than the first reference signal 832_1. In this case, the first comparator 840_1 may output a first control signal 842_1 indicating that the impact detection condition is satisfied. Thereafter, the first latch 850_1 may receive the first control signal 842_1 and generate a sustain signal maintaining the first control signal, and pass the same to the driver 870. The driver 870 may cut off the output of the battery while receiving the sustain signal.

According to some embodiments, the controller 860 may count the number of times that the amplified signal 812 is determined to be greater than the second reference signal 832_2 to the nth reference signal 832_n, respectively. Because the control signals 842_1 to 842_n are output in response to the amplified signal 812 determined to be greater than the reference signals 832_1 to 832_n and the sustain signals are generated by the control signals 842_1 to 842_n, the controller 860 may count the number of times that the sustain signals from the second latch 850_2 to the nth latch 850_n are transferred to the controller 860, respectively. In this case, in response to the sustain signal of each of the second latch 850_2 to the nth latch 850_n transferred to the controller 860, the latch that transferred the sustain signal may be initialized and the sustain signal may be interrupted, thereby allowing the sustain signals to be counted. Subsequently, the driver 870 may cut off the output of the battery on the basis of the number of times determined by the controller 860.

In a case where the impact signal of the vehicle is input as an intermittent signal having a magnitude the same as or smaller than the first reference signal 832_1 due to the aging of the vehicle or various abnormalities inside the vehicle, the first comparator 840_1 may not detect the impact signal. By using the hybrid vehicle impact detection device further including the second to nth comparators 840_2 to 840_n and the controller 860 capable of detecting such a modified impact signal having temporal repeatability equal to or greater than the temporal repeatability of the vehicle, the number of occurrences of intermittently input impact signals may be counted, and at the occurrence of a number of impact signals (e.g., a set or predetermined number of impact signals) or more, it may be determined that a crash has occurred. That is, due to the use of the comparators 840_1 to 840_n, the reference voltage may be variously set, and impact signals variously modified by abnormalities of the vehicle may be detected.

Figure 9:
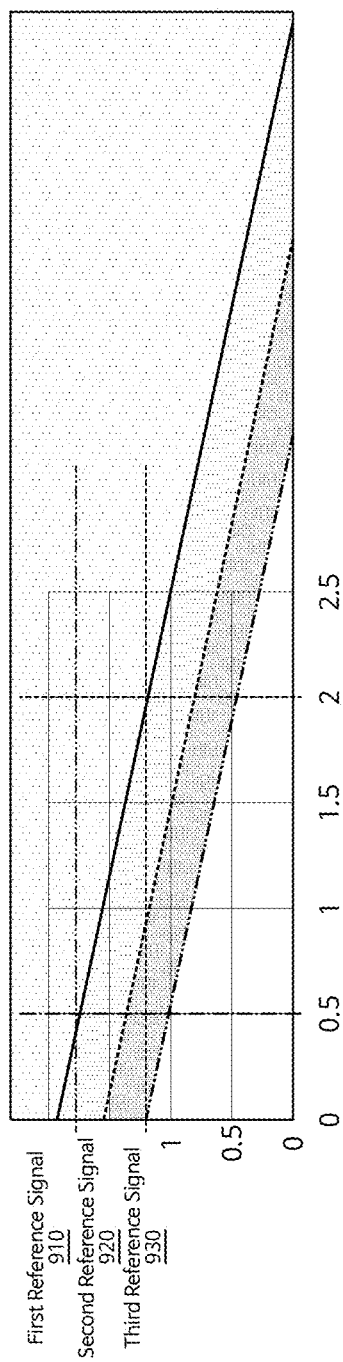
FIG. 9 illustrates a plurality of reference signals of the vehicle impact detection device in FIG. 8.

FIG. 9 illustrates a plurality of reference signals 910, 920, and 930 of the vehicle impact detection device in FIG. 8. Herein, the first reference signal 910 may correspond to the first reference signal 832_1 in FIG. 8, and each of the second reference signal 920 and the third reference signal 930 may be any of the second reference signal 832_2 to nth reference signal 832_n in FIG. 8.

The driver may cut off the output of the battery on the basis of the determination that the amplified signal is greater than the first reference signal 910. In addition, the control unit or the driver may cut off the output of the battery on the basis of a first number of times by which the amplified signal is determined to be greater than the second reference signal 920 or a second number of times by which the amplified signal is determined to be greater than the third reference signal 930. In another example, the first number of times by which the amplified signal is determined to be greater than the second reference signal 920 or the second number of times by which the amplified signal is determined to be greater than the third reference signal 930 may be used to determine whether the vehicle or the vehicle impact detection device has reached the end of the service life thereof.

With this configuration, even in a case where the impact signal is smaller than the normal magnitude due to the aging of the vehicle or internal abnormalities of the vehicle when an impact having a magnitude (e.g., a set or predetermined magnitude) or more is applied to the vehicle, the output of the battery may be cut off or whether the vehicle or the vehicle impact detection device has reached the end of the service life may be determined, thereby inducing the replacement of the vehicle or the vehicle impact detection device.

Figure 10:
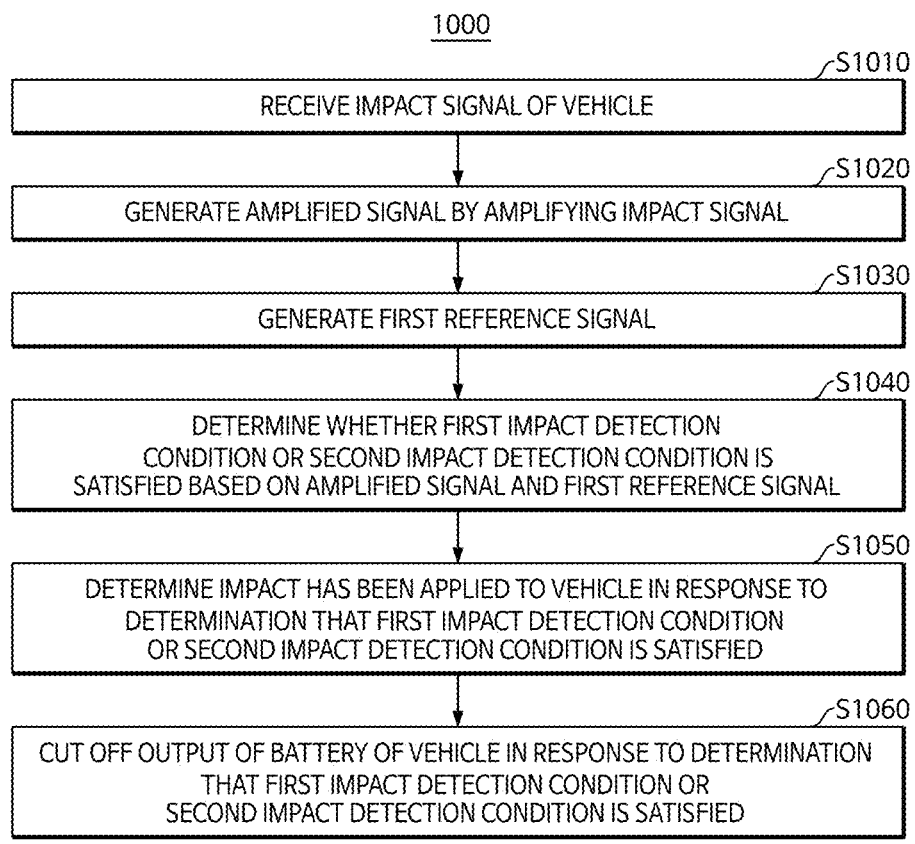
FIG. 10 illustrates a flowchart showing a vehicle impact detection method according to one or more embodiments of the present disclosure.

FIG. 10 illustrates a flowchart showing a vehicle impact detection method 1000 according to one or more embodiments of the present disclosure. Although FIG. 10 illustrates various operations of a vehicle impact detection method according to some embodiments, embodiments according to the present disclosure are not limited thereto. For example, according to some embodiments, the vehicle impact detection method may include additional operations or fewer operations, or the operations may be in a different order (unless otherwise stated or implied), without departing from the spirit and scope of embodiments according to the present disclosure. The method 1000 may be performed by the vehicle impact detection device. The vehicle impact detection device may include an amplifier, a comparative voltage circuit, a comparator, a latch, a driver, a control unit, and the like. The method 1000 may be initiated by the amplifier receiving an impact signal of a vehicle (S1010). The amplifier may amplify the received impact signal to generate an amplified signal (S1020).

The comparative voltage circuit may generate a first reference signal (S1030). According to some embodiments, the magnitude of the first reference signal may decrease over time in response to the comparative voltage circuit detecting the amplified signal output by the amplifier.

Thereafter, the comparator may determine whether a first impact detection condition (e.g., a set or predetermined first impact detection condition) or a second impact detection condition (e.g., a set or predetermined second impact detection condition) is satisfied on the basis of the amplified signal and the first reference signal (S1040).

In response to the determination that the first impact detection condition (e.g., the set or predetermined first impact detection condition) or the second impact detection condition (e.g., the set or predetermined second impact detection condition) is satisfied, it may be determined that an impact has been applied to the vehicle (S1050). According to some embodiments, the comparator may output a control signal for cutting off the output of the battery in response to the determination that the first impact detection condition (e.g., the set or predetermined first impact detection condition) or the second impact detection condition (e.g., the set or predetermined second impact detection condition) is satisfied.

According to some embodiments, the first impact detection condition may be a condition in which the impact signal is maintained for a first time or more at a first magnitude or more, and the second impact detection condition may be a condition in which the impact signal is maintained for a second time or more at a second magnitude or more. Herein, the first magnitude may be greater than the second magnitude, and the first time may be shorter than the second time.

In response to the determination that the first impact detection condition (e.g., the set or predetermined first impact detection condition) or the second impact detection condition (e.g., the set or predetermined second impact detection condition) is satisfied, the output of the battery of the vehicle may be cut off (S1060). According to some embodiments, the driver may cut off the output of the battery on the basis of the control signal output by the comparator.

According to some embodiments, the second comparator may compare the amplified signal with the second reference signal, and the driver and/or the controller may cut off the output of the battery on the basis of the number of times by which the amplified signal output by the amplifier is determined to be greater than the second reference signal. Herein, the magnitude of the second reference signal may be smaller than the magnitude of the first reference signal. In another example, a first number of times by which the amplified signal output by the amplifier is determined to be greater than the first reference signal and a second number of times by which the amplified signal output by the amplifier is determined to be greater than the second reference signal may be transferred to an external device, and may be used to determine whether the vehicle or vehicle impact detection device has reached the end of the service life thereof.

The flowchart illustrated in and the above description provided with reference to FIG. 10 are merely illustrative, and may be implemented differently in other embodiments. For example, the order of some steps may be changed, some steps may be omitted, other components may be added, and some steps described as being performed sequentially may be performed together.

Although the present disclosure has been described with reference to aspects of some embodiments and drawings illustrating aspects thereof, the present disclosure is not limited thereto. Various modifications and variations can be made by a person skilled in the art to which the present disclosure belongs within the scope of the technical spirit of the present disclosure and the claims and their equivalents, below.

What is claimed is:

1. A vehicle impact detection device comprising:
    an amplifier configured to receive and amplify an impact signal of a vehicle;
    a comparative voltage circuit configured to generate a first reference signal;
    a first comparator configured to output a control signal indicating that a predetermined first impact detection condition or a predetermined second impact detection condition is satisfied, based on an amplified signal output by the amplifier and the first reference signal; and
    a driver configured to cut off an output of a battery on basis of the control signal,
    wherein the comparative voltage circuit is configured to reduce a magnitude of the first reference signal over time in response to detection of the amplified signal output by the amplifier.

2. The vehicle impact detection device as claimed in claim 1, wherein the first impact detection condition is a condition in which the impact signal is maintained at a first magnitude or more for a first time or more,
    the second impact detection condition is a condition in which the impact signal is maintained at a second magnitude or more for a second time or more, and
    the first magnitude is greater than the second magnitude, and the first time is shorter than the second time.

3. The vehicle impact detection device as claimed in claim 2, wherein an initial magnitude of the first reference signal is greater than an amplified signal magnitude of the first magnitude, and the drop rate over time of the first reference signal increases with decreases in the second magnitude.

4. The vehicle impact detection device as claimed in claim 2, wherein an initial magnitude of the first reference signal is greater than an amplified signal magnitude of the first magnitude, and the drop rate over time of the first reference signal decreases with increases in the difference between the first time and the second time.

5. The vehicle impact detection device as claimed in claim 2, wherein based on the first comparator determining the amplified signal is greater than the first reference signal at a first time point after the magnitude of the first reference signal has begun to decrease, the first impact detection condition is detected, and
    the first time point is a time point that has passed the first time and has not passed the second time after the magnitude of the first reference signal has begun to decrease.

6. The vehicle impact detection device as claimed in claim 2, wherein based on the first comparator determining the amplified signal is greater than the first reference signal at a second time point after the magnitude of the first reference signal has begun to decrease, the second impact detection condition is detected, and
    the second time point is a time point that has passed the second time after the magnitude of the first reference signal has begun to decrease.

7. The vehicle impact detection device as claimed in claim 1, wherein the comparative voltage circuit comprises:
    a constant voltage source; and
    a switch,
    wherein the switch is configured to cut off the constant voltage source in response to the detection of the amplified signal.

8. The vehicle impact detection device as claimed in claim 7, wherein the comparative voltage circuit further comprises at least one resistor and at least one capacitor,
    wherein based on the constant voltage source being cut off, the first reference signal stored in the at least one capacitor is discharged via the at least one resistor to reduce the magnitude of the first reference signal over time.

9. The vehicle impact detection device as claimed in claim 1, wherein an initial magnitude and a drop rate over time of the first reference signal are determined based on the first impact detection condition and the second impact detection condition.

10. The vehicle impact detection device as claimed in claim 1, wherein the first comparator is configured to output the control signal in response to determination that the amplified signal is greater than the first reference signal.

11. The vehicle impact detection device as claimed in claim 1, further comprising a latch configured to receive the control signal and to transmit a sustain signal maintaining the control signal to the driver.

12. The vehicle impact detection device as claimed in claim 1, further comprising a low-pass filter between the amplifier and the first comparator.

13. The vehicle impact detection device as claimed in claim 1, further comprising a second comparator configured to compare the amplified signal and a second reference signal,
wherein a magnitude of the second reference signal is smaller than the magnitude of the first reference signal, and
the driver is configured to cut off an output of the battery based on a number of times by which the amplified signal output by the amplifier is determined to be greater than the second reference signal.

14. The vehicle impact detection device as claimed in claim 13, wherein a first number of times by which the amplified signal output by the amplifier is determined to be greater than the first reference signal and a second number of times by which the amplified signal output by the amplifier is determined to be greater than the second reference signal are transferred to an external device, and
whether the vehicle or the vehicle impact detection device has reached an end of a life time thereof is determined based on the first number of times and the second number of times.

15. The vehicle impact detection device as claimed in claim 1, further comprising a resistor,
wherein the impact signal is generated by an impact current passing through the resistor, the impact current being generated in response to an impact being applied to the vehicle.

16. A vehicle comprising the vehicle impact detection device as claimed in claim 1.

17. The vehicle as claimed in claim 16, further comprising:
an electronic control unit configured to generate an impact current in response to an impact applied to the vehicle;
a battery configured to supply drive power of the vehicle; and
a battery management system associated with the battery,
wherein the battery management system comprises the vehicle impact detection device.

18. A vehicle impact detection method comprising:
receiving an impact signal of a vehicle and generating an amplified signal by an amplifier;
generating a first reference signal by a comparative voltage circuit;
determining whether a predetermined first impact detection condition or a predetermined second impact detection condition is satisfied by a comparator, based on the amplified signal and the first reference signal; and
outputting, by the comparator, a control signal to cut off an output of a battery, in response to the determination that the predetermined first impact detection condition or the predetermined second impact detection condition is satisfied,
wherein a magnitude of the first reference signal decreases over time in response to the comparative voltage circuit detecting the amplified signal output by the amplifier.

19. The vehicle impact detection method as claimed in claim 18, further comprising cutting off the output of the battery by a driver, based on the control signal.

20. The vehicle impact detection method as claimed in claim 18, wherein the first impact detection condition is a condition in which the impact signal is maintained at a first magnitude or more for a first time or more,
the second impact detection condition is a condition in which the impact signal is maintained at a second magnitude or more for a second time or more, and
the first magnitude is greater than the second magnitude, and the first time is shorter than the second time.

* * * * *